United States Patent
Yamaguchi

(10) Patent No.: US 7,860,637 B2
(45) Date of Patent: Dec. 28, 2010

(54) ECO-RUN CONTROL DEVICE AND METHOD FOR RESETTING THE SAME

(75) Inventor: Kazuhi Yamaguchi, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 345 days.

(21) Appl. No.: 12/081,478

(22) Filed: Apr. 16, 2008

(65) Prior Publication Data

US 2008/0262708 A1 Oct. 23, 2008

(30) Foreign Application Priority Data

Apr. 20, 2007 (JP) ............................. 2007-112414

(51) Int. Cl.
- F02N 11/08 (2006.01)
- F02D 17/00 (2006.01)
- F02D 15/00 (2006.01)

(52) U.S. Cl. .................................. 701/112; 123/179.3
(58) Field of Classification Search ............. 123/179.4, 123/179.3; 701/112, 113
See application file for complete search history.

(56) References Cited

U.S. PATENT DOCUMENTS

| | | | | |
|---|---|---|---|---|
| 3,731,108 | A | * | 5/1973 | Kobara et al. ............. 290/38 R |
| 4,286,683 | A | * | 9/1981 | Zeigner et al. ........... 123/179.4 |
| 4,481,425 | A | * | 11/1984 | Hori et al. ................ 123/179.4 |
| 5,826,671 | A | * | 10/1998 | Nakae et al. ............. 123/179.4 |
| 6,275,759 | B1 | * | 8/2001 | Nakajima et al. ........ 123/179.4 |
| 6,823,827 | B2 | * | 11/2004 | Sugiura et al. ........... 123/179.4 |
| 6,839,621 | B2 | * | 1/2005 | Kaneko ...................... 701/112 |
| 6,847,864 | B2 | | 1/2005 | Goto et al. |
| 6,865,451 | B2 | * | 3/2005 | Onoyama et al. .......... 701/112 |
| 7,219,007 | B2 | * | 5/2007 | Schuster et al. ............ 701/112 |
| 2003/0089326 | A1 | * | 5/2003 | Ujifusa ..................... 123/179.4 |
| 2004/0029556 | A1 | | 2/2004 | Goto et al. |
| 2005/0103302 | A1 | | 5/2005 | You |
| 2006/0191518 | A1 | | 8/2006 | Kiessling |
| 2007/0066442 | A1 | * | 3/2007 | Ido ............................. 477/107 |
| 2007/0151536 | A1 | * | 7/2007 | Yamauchi et al. ........ 123/179.4 |

FOREIGN PATENT DOCUMENTS

| | | |
|---|---|---|
| JP | A-2-275033 | 11/1990 |
| JP | A-4-203455 | 7/1992 |
| JP | A-7-013788 | 1/1995 |
| JP | A-2001-80390 | 3/2001 |
| JP | A-2004-017676 | 1/2004 |
| JP | A-2004-308497 | 11/2004 |
| JP | A-2004-338661 | 12/2004 |
| JP | A-2006-207380 | 8/2006 |
| JP | A-2006-275017 | 10/2006 |
| JP | A-2006-315427 | 11/2006 |

* cited by examiner

Primary Examiner—Stephen K Cronin
Assistant Examiner—Arnold Castro
(74) Attorney, Agent, or Firm—Oliff & Berridge, PLC

(57) ABSTRACT

An eco-run control device is mounted on a vehicle and is capable of performing eco-run control to stop an engine when predetermined stop requirements are satisfied and restart the engine when predetermined start requirements are satisfied later. This eco-run control device includes: a monitoring unit that monitors the state of an ignition; a communicating unit that communicates with a plurality of control devices that receive power supplies from a power supply line that is connected to a power source via the ignition; and an initialization controlling unit that initializes the data with respect to the eco-run control stored in a memory, when the monitoring unit determines that the ignition is in an OFF state, and that the communications with two or more of the control devices are interrupted.

9 Claims, 5 Drawing Sheets

ECO-RUN CONTROL DEVICE AND METHOD FOR RESETTING THE SAME

BACKGROUND OF THE INVENTION

1. Field of the Invention

The present invention relates to an eco-run control device that has an eco-run function to drive a vehicle while starting and stopping the engine.

2. Description of the Related Art

In recent years, to improve fuel efficiency and reduce emission, eco-run control devices are mounted on vehicles. An eco-run control device issues an engine stop instruction when predetermined engine stop requirements are satisfied, and later issues an engine restart instruction to drive an engine starting motor when predetermined engine start requirements are satisfied.

An eco-run ECU that performs eco-run control operations determines whether to stop the engine and whether to start the engine, based on an eco-run allowing signal and an eco-run prohibiting signal transmitted from another ECU, and signals transmitted from various sensors and actuators.

An eco-run ECU and most ECUs cooperating with the eco-run ECU form a so-called IG system, and power is supplied to the ECUs when the ignition switch is switched on. In the IG system, when the ignition key is turned off, the power supply to the ECU is cut off, and the ECUs are put into a reset state. However, data needs to be written in a nonvolatile memory in the eco-run ECU, and therefore, the eco-run ECU has a main relay so that an operation can be continued for a predetermined period of time (approximately 3 seconds) after the ignition key is turned off.

When the driver switches the ignition key from an ON state to an OFF state to an ON state in a short period of time during an eco-run control operation, the eco-run ECU is not reset, but the other ECUs are reset. Therefore, the other ECUs transmit an eco-run prohibiting signal to the eco-run ECU when the ignition key is switched from an OFF state to an ON state.

The eco-run ECU that has received the eco-run prohibiting signal drives the starter motor in accordance with the eco-run prohibiting signal. In other words, the starter driving is performed, with the switching of the ignition key from an OFF state to an ON state being a trigger. As a result, the starter driving is automatically started, even though the driver does not operate to turn on the starter motor. This makes the driver feel uneasy. In the worst case, the vehicle suddenly moves forward.

To counter such a problem, the RAM in the eco-run ECU is pseudo-reset by software. The RAM is reset when the ignition key is in an OFF state and an interruption is detected in a communication of one of the ECUs communicating with the eco-run ECU. The ECUs that communicate with the eco-run ECU may be any ECUs among the ECUs connected to an IG line, the ECUs connected to an accessory power supply line, and the ECUs connected to a +B line. The IG line is the power supply line connected to the +-pole of the battery via the ignition switch. The accessory power supply line is the power supply line connected to the +-pole of the battery via an accessory switch. The +B line is the power supply line connected directly to the +-pole of the battery.

Japanese Unexamined Patent Publication No. 2004-17676 discloses a technique by which a control device that is connected to a network and has an error is restarted and is put back into an initialized state when the error is caused.

By a conventional method for resetting an eco-run ECU, the eco-run ECU is reset when a communication between the eco-run ECU and an ECU connected to the +B line or the ACC line is interrupted. By this method, the IG switch is determined to be OFF due to an inadvertent key operation, when a communication with another ECU is interrupted due to disconnection or temporary disconnection of the IG line. In such a case, the RAM of the eco-run ECU is reset, so as to prohibit the eco-run ECU from performing an engine start control operation, or to stop the engine.

In communications between the eco-run ECU and the other ECUs, the compensation for a low voltage is 8 V or higher. Therefore, when the IG line is temporarily disconnected at the time of a low voltage, communications might become invalid. Accordingly, there is a possibility that the eco-run ECU is frequently reset when the voltage is low.

Japanese Unexamined Patent Publication No. 2004-17676 does not disclose a method for determining whether the ignition switch is switched off by an operation of the ignition key or temporary disconnection of the IG line.

SUMMARY OF THE INVENTION

It is therefore an object of the present invention to provide an eco-run control device and a method for resetting the eco-run control device in which the above disadvantages are eliminated.

A more specific object of the present invention is to provide an eco-run control device and a reset method by which eco-run control against a user's will is restricted.

According to an aspect of the present invention, there is provided an eco-run control device that is mounted on a vehicle and is capable of performing eco-run control to stop an engine when predetermined stop requirements are satisfied and restart the engine when predetermined start requirements are satisfied later, the eco-run control device including: a monitoring unit that monitors a state of an ignition; a communicating unit that communicates with a plurality of control devices that receive power supplies from a power supply line that is connected to a power source via the ignition; and an initialization controlling unit that initializes data with respect to the eco-run control stored in a memory, when the monitoring unit determines that the ignition is in an OFF state, and that the communications with two or more of the control devices are interrupted.

According to another aspect of the present invention, there is provided an eco-run control device that is mounted on a vehicle and is capable of performing eco-run control to stop an engine when predetermined stop requirements are satisfied and restart the engine when predetermined start requirements are satisfied later, the eco-run control device including: an engine start controlling unit that performs a start control operation on the engine, when receiving an eco-run prohibiting request from another control device mounted on the vehicle; and an engine start control prohibiting unit that prohibits the engine start controlling unit from performing the start control operation on the engine, when an ignition is in an OFF state and communications with two or more of other control devices are interrupted, the other control device having a power source switched on and off in accordance with the state of the ignition.

According to yet another aspect of the present invention, there is provided an eco-run control device that is mounted on a vehicle and is capable of performing eco-run control to stop an engine when predetermined stop requirements are satisfied and restart the engine when predetermined start requirements are satisfied later, the eco-run control device including: an engine state controlling unit that puts the engine into a started state, when receiving an eco-run prohibiting request from another control device mounted on the vehicle, the engine state controlling unit putting the engine into an stopped state even when receiving the eco-run prohibiting request, where an ignition is in an OFF state and communications with two or more of other control devices are interrupted, the other control device having a power source switched on and off in accordance with the state of the ignition.

According to a further aspect of the present invention, there is provided a method for resetting an eco-run control device, including the steps of: determining that an ignition is in an OFF state with the use of a monitoring unit; determining a state of each communication with a plurality of control devices that receive a power supply from a power supply line that is connected to a power source via the ignition; and initializing data with respect to the eco-run control stored in a memory, when the monitoring unit determines that the communications with two or more of the control devices are interrupted.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of a preferred embodiment of the present invention, with reference to the accompanying drawings.

Embodiment

Figure 1:
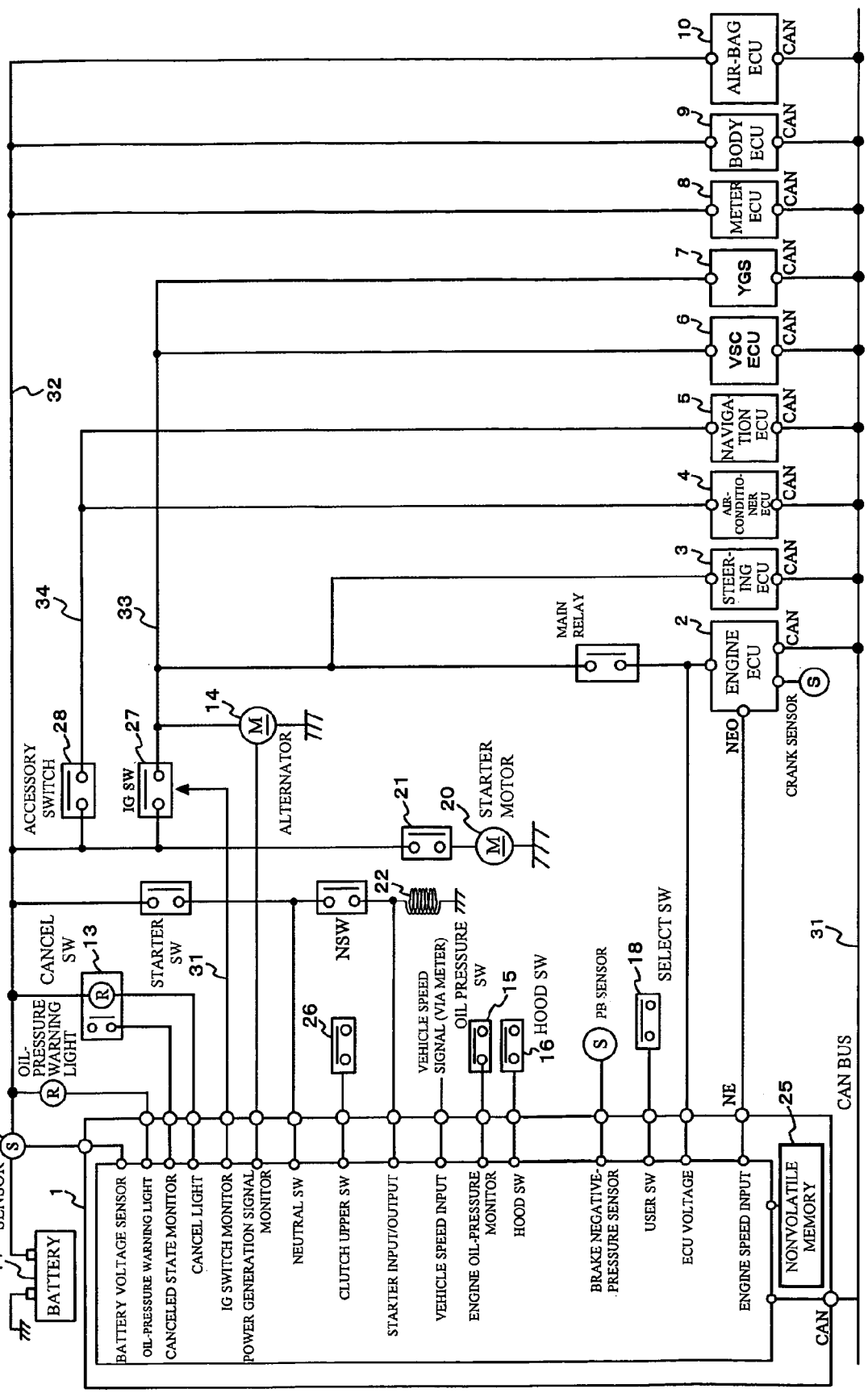
FIG. 1 illustrates the connections between an eco-run ECU, as well as the peripheral circuits, and ECUs that perform CAN communication with the eco-run ECU.

Referring first to FIG. 1, the structure of this embodiment is described in detail. In this embodiment, an eco-run ECU (this eco-run ECU includes the initialization controller, the engine start controller, the engine start control prohibiting unit, and the engine state controller of the present invention) 1 and nodes are connected to a CAN (Controller Area Network) bus 31. In FIG. 1, an engine ECU 2, a steering ECU 3, an air conditioner ECU 4, a navigation ECU 5, a vehicle stability control ECU (hereinafter referred to as VSC ECU) 6, a yaw rate G sensor 7, a meter ECU 8, a body ECU 9, and an air bag ECU 10 are shown as the nodes that perform CAN communications with the eco-run ECU 1. However, the nodes are not limited to those nodes.

Each of the nodes receives a power supply from a battery 11 to operate. The eco-run ECU 1, the meter ECU 8, the body ECU 9, and the air bag ECU 10 are connected to a +B line 32 that is connected directly to the +-pole of the battery 11. The engine ECU 2, the VSC ECU 6, the yaw rate G sensor 7, and the likes are connected to an IG line 33 that is connected to the +-pole of the battery 11 via an ignition switch (hereinafter referred to as the IG switch) 27. The air conditioner ECU 4, the navigation ECU 5, and the likes are connected to an accessory source line 34 that is connected to the +-pole of the battery 11 via an accessory switch (hereinafter referred to as the ACC switch) 28.

The engine ECU 2 is connected to an EFI (Electronic Fuel Injection) that electronically controls the amount of fuel injection to the engine. With this arrangement, the engine ECU 2 controls engine outputs, and adjusts the driving speed.

The steering ECU 3 electronically controls the steering angle of the steering unit that steers the front wheels, so as to adjust the driving direction of the vehicle.

The air conditioner ECU 4 is connected to an operation unit (not shown) that is designed to set the temperature of a vehicle air-conditioning device (not shown) and selects an air outlet or the like. Based on the detected values of an ambient temperature sensor (not shown), an inside temperature sensor (not shown), and an insolation sensor (not shown), the air conditioner ECU 4 performs various control operations in accordance with the settings of the operation unit and the likes.

When the position of a destination is input through an operation switch (not shown), the navigation ECU 5 automatically selects the optimum route from the current location of the vehicle to the destination, and calculates a guide route. The navigation ECU 5 then causes a display device (not shown) to display route guide information.

Based on information that is supplied from an acceleration sensor or a vehicle speed sensor (not shown) or the like, the VSC ECU 6 sends an instruction to the engine ECU 2 to restrict engine outputs, or sends an instruction to a brake actuator (not shown) to control the vehicle speed and stabilize the position of the vehicle.

The yaw rate G sensor 7 is formed with a yaw rate sensor and a G sensor.

The yaw rate sensor detects the angular velocity (hereinafter referred to as the yaw rate) around the axis line (the rolling axis) passing through the center of gravity of the vehicle and extending forward and backward from the vehicle. The G sensor includes a front-back G sensor that detects the acceleration in the front-back direction of the vehicle, and a transverse G sensor that detects the acceleration in the transverse direction of the vehicle.

The meter ECU 8 receives detection signals from various sensors (not shown), and performs various operations. By doing so, the meter ECU 8 generates outputs for displaying the vehicle traveling speed, the engine speed, the shift position, the remaining amount of fuel, and the water temperature.

The body ECU 9 controls vehicle-mounted mechanisms such as a door lock mechanism or a power window mechanism.

The air bag ECU 10 activates an air bag, when a G sensor (not shown) senses a collision of the vehicle.

Each of the above described ECUs transmits an eco-run prohibition signal to the eco-run ECH 1, when the ECU is activated by switching the IG switch from an OFF state to an ON state or the like.

The eco-run ECU 1 also has an input terminal for inputting signals from various sensors, an output terminal for switching on and off a switch, and the likes.

For example, the eco-run ECU 1 further includes: a terminal for inputting a sensor signal from a voltage sensor 12 that detects the voltage of the battery 11; a terminal that monitors the state of an eco-run cancel switch 13 for canceling an eco-run; an IG switch monitoring terminal that monitors the switching on and off of the IG switch 27; a terminal that monitors the power generating state of an alternator (a generator) 14; a vehicle speed input terminal; a terminal that detects the oil pressure with an oil pressure switch 15 provided on an oil passage; a terminal that inputs a signal from a hood switch 16 that outputs signals in accordance with the open/closed states of the front hood and the rear hood of the vehicle; a terminal that outputs a driving signal to a motor IC 17 that controls the driving of an electric pump; a terminal that monitors the driving of the electric pump; a user SW terminal that detects an operation of a select switch 18 by the driver; and a terminal that receives the engine speed from the engine ECU 2.

The eco-run ECU 1 also has a detecting unit that detects starting operations such as a shift operation, a brake operation, and a clutch operation performed by the driver.

Detection of a shift operation is performed by the eco-run ECU 1 receiving and judging information supplied from a shift position sensor that detects the operation position of a shift lever (not shown) through the engine ECU 2. Detection of a brake operation is performed by the eco-run ECU 1 receiving and judging information supplied from a brake master cylinder pressure sensor (not shown) through a brake ECU (not shown). Detection of a clutch operation is performed by the eco-run ECU 1 inputting a signal from a clutch upper switch 26.

The eco-run ECU 1 also automatically starts the engine, when an engine starting factor (such as a vehicle error, a negative pressure release, or a start request from any other ECU) other than the above driver's starting operations is detected.

Also, when receiving an eco-run prohibiting signal from some other ECU, the eco-run ECU 1 performs a control operation such as driving of a starter motor 20, so as to put the engine into an activated state.

The starter motor 20 is connected to the +B line 32 that supplies power from the battery 11. When a starter relay 21 is turned on by connecting the starter relay 21 to a coil 22, the power from the battery 11 is supplied to the starter motor 20. As the starter motor 20 is activated, the engine is started.

The starter relay 21 is also connected to the eco-run ECU 1. The starter relay 21 is turned on by a control signal transmitted from the eco-run ECU 1, so that the engine can be started by the starter motor 20.

A nonvolatile memory 25 connected to the eco-run ECU 1 stores processing programs and the likes to be used for controlling the eco-run ECU 1.

Figure 2:
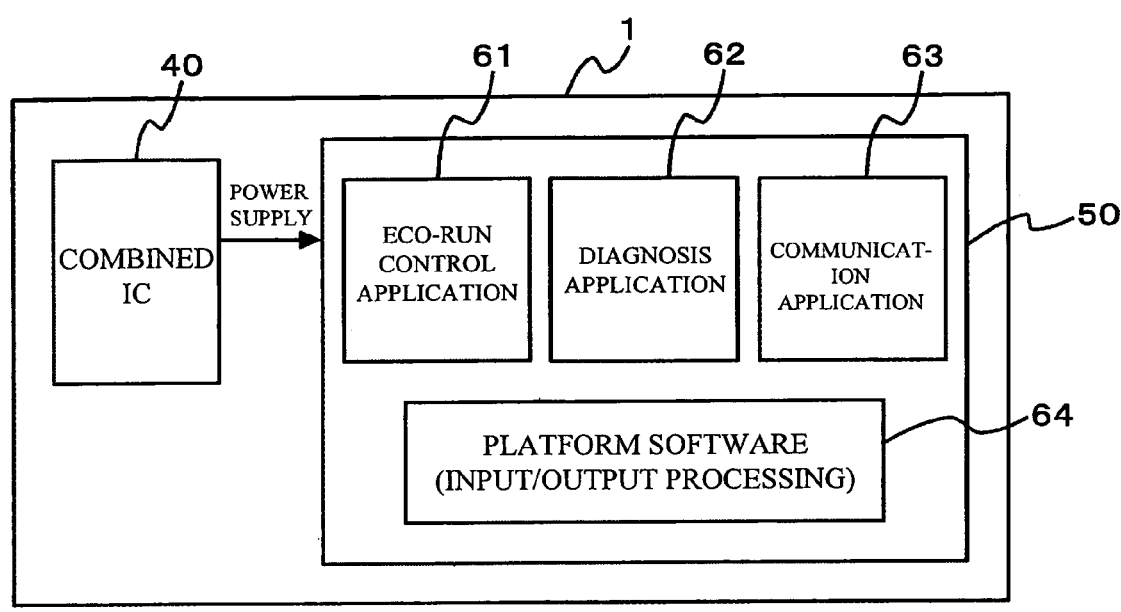
FIG. 2 illustrates the structure of the eco-run ECU.

FIG. 2 illustrates the structure of the eco-run ECU 1. The eco-run ECU 1 includes a combined IC 40 and a microcomputer 50. The combined IC 40 controls the power supply to the microcomputer 50.

Figure 3:
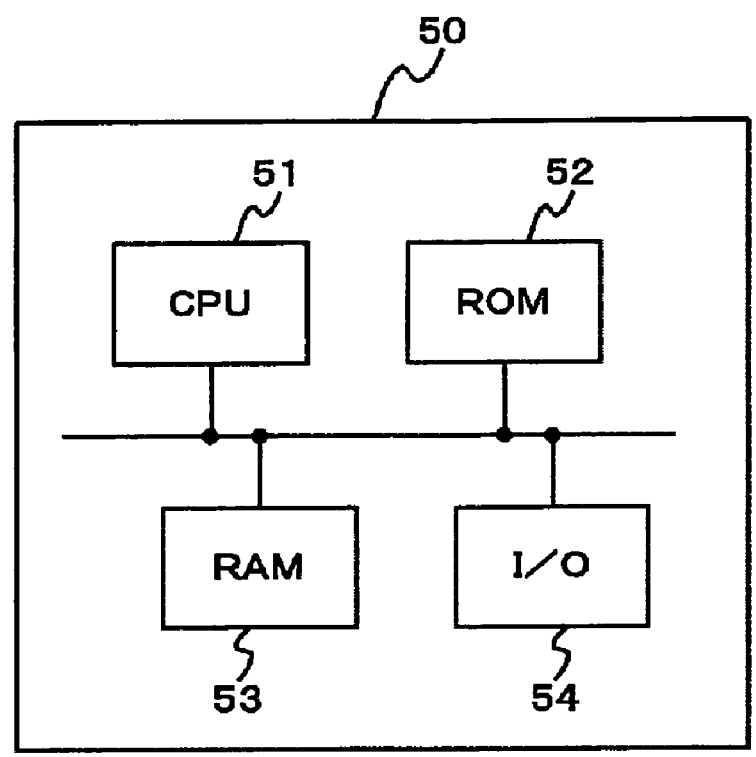
FIG. 3 illustrates the hardware structure of the eco-run ECU.

As shown in FIG. 3, the microcomputer 50 includes: a central processing unit (CPU) 51 that performs various operations in accordance with programs; a ROM 52 that is a read-only memory that stores the processing program and the likes to be executed by the CPU 51; a RAM 53 that is a readable and rewritable memory that has a work area to be used in the various processing operations performed by the CPU 51, and a data storage area that stores various kinds of data; and a data input/output port (shown as "I/O" in the drawing) 54.

The programs to be realized by the microcomputer 50 performing operations in accordance with programs read from the ROM 52 are an eco-run control application 61, a diagnosis application 62, a communication application 63, and platform software 64 shown in FIG. 2.

The eco-run control application 61 is an application for eco-run control operations. When predetermined requirements for an engine stop are satisfied, the eco-run control application 61 instructs the engine ECU 2 to stop the engine, so as to stop idling of the engine. When the requirements for an engine start are satisfied after that, the eco-run control application 61 instructs the engine ECU 2 to restart the engine. Under control of the engine ECU 2, the starter motor is driven to start the engine.

The diagnosis application 62 determines diagnosis codes and recovery processes in accordance with the diagnosis codes as the specifications. The diagnosis application 62 creates a self-diagnosing program to perform operations in accordance with the specifications, and incorporates the program into the ROM or the like. The CPU then executes this program. If a hardware error is detected, the CPU writes the diagnosis code corresponding to the type of the error into the memory, and carries out the error recovery process corresponding to the diagnosis code.

The communication application 63 performs communications with nodes such as the other ECU and sensors connected by a communication line in accordance with the CAN protocol.

In this embodiment, when switching of the IG switch 27 from an OFF state to an ON state is detected by a monitor signal for monitoring the state of the IG switch 27 between the time when the IG switch 27 is switched off and the time when the power supply to the eco-run ECU 1 is cut off, the variables with respect to eco-run control recorded in the RAM of the eco-run ECU 1 are initialized.

The state of the monitor signal is changed from an IG switch OFF state to an IG switch ON state, when the IG switch 27 is switched from an OFF state to an ON state by the driver operating the ignition key, or when a signal line 30 that monitors the state of the IG switch 27 is temporarily disconnected.

In this embodiment, the eco-run ECU 1 determines whether the IG switch 27 is switched on and off by a driver's operation or temporary disconnection of the signal line 30. The variables recorded in the RAM of the eco-run ECU 1 are reset only when the IG switch 27 is switched from an OFF state to an ON state by an operation performed by the driver.

More specifically, the eco-run ECU 1 determines that the IG switch 27 is switched from an OFF state to an ON state by an operation performed by the driver, when the state of the monitor signal is put into an IG switch OFF state and the communications with two or more of the nodes connected to the IG line 33 are interrupted.

In CAN communications, when the IG switch 27 is switched off, the nodes connected to the IG line 33 stop performing CAN communications. Accordingly, the eco-run ECU 1 monitors CAN communications to determine whether the IG switch 27 is switched off.

When the state of the monitor signal is switched from an IG switch OFF state to an IG switch ON state by temporarily disconnecting the signal line 30 that monitors the IG line 33, the IG switch 27 might be ON. Accordingly, data is transmitted from the nodes connected to the IG line 33 via CAN communications.

As the number of nodes having communications interrupted becomes larger, the number of reset errors becomes smaller in the eco-run ECU 1.

To detect switching on and off of the IG switch 27, driver's operations or information supplied from the navigation ECU 5 can be referred to.

For example, the information may be a signal indicating the position of the shift lever, a signal indicating the vehicle speed, a signal indicating the engine speed, a signal indicating that the foot brake is stepped on, a signal indicating that a door is opened or closed, and the likes. Also, a navigation destination and the current location information about the vehicle may be input from the navigation ECU 5, and switching on and off of the IG switch 27 may be detected based on the information.

Figure 4:
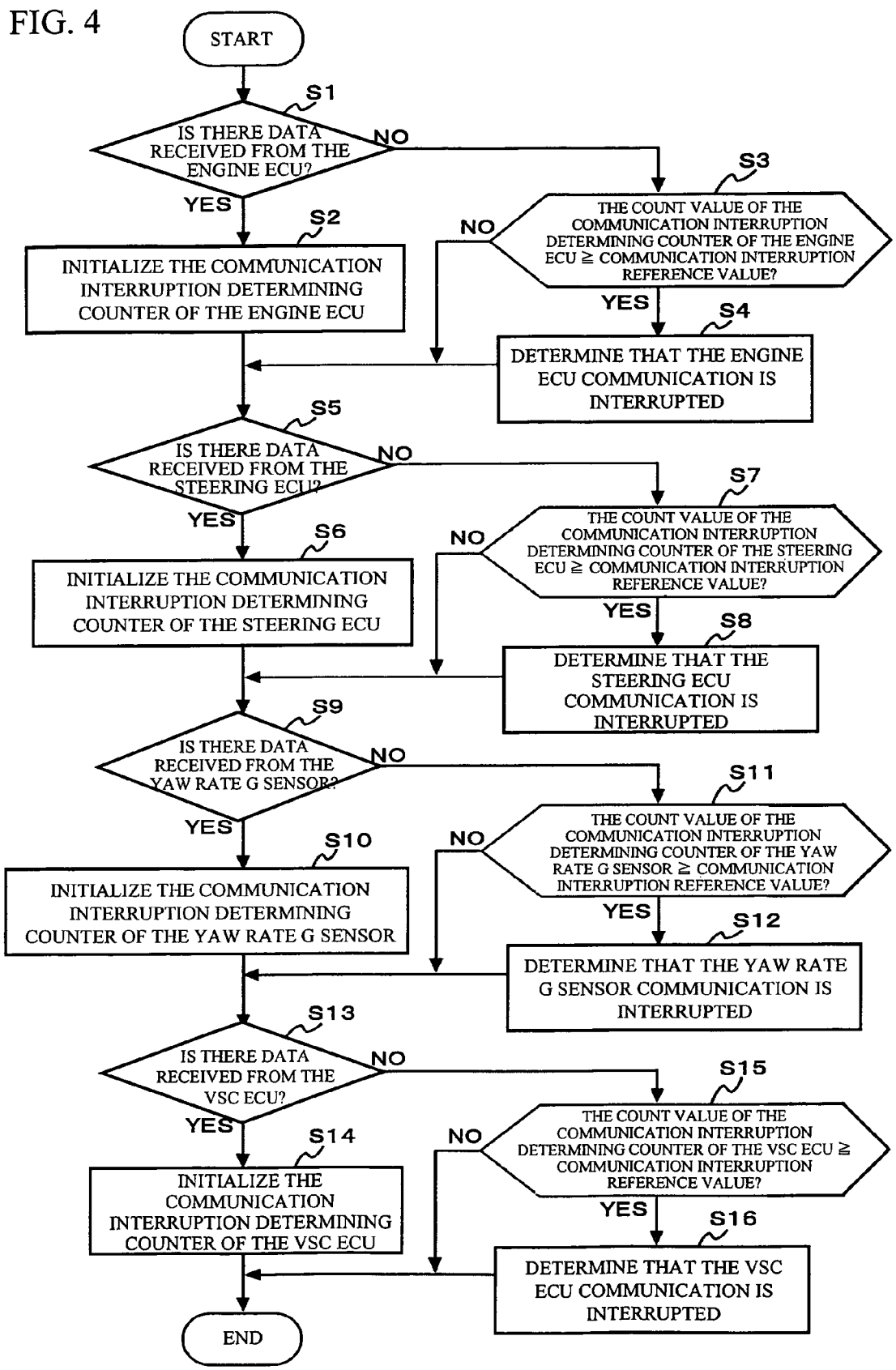
FIG. 4 is a flowchart showing the procedures for determining whether there is an interruption of a communication between each node connected to the IG line and the eco-run ECU.

Referring now to the flowchart shown in FIG. 4, a communication interruption determining operation for determining whether a communication with a node connected to the IG line 33 is interrupted is described.

The communication application 63 has a communication interruption determining counter for each of the nodes connected to the IG line 33, and monitors the state of a communication with each node, based on the count value.

When receiving data from the engine ECU 2 ("YES" in step S1), the communication application 63 initializes the communication interruption determining counter for the engine ECU (step S2). If there is no data received from the engine ECU 2 ("NO" in step S1), the communication application 63 compares the count value of the communication interruption determining counter for the engine ECU with the reference value for determining a communication interruption (step S3). If the count value is equal to or larger than the reference value ("YES" in step S3), the communication application 63 determines that the communication with the engine ECU 2 is in an interrupted state (step S4).

The communication application 63 then determines whether there is data received from the steering ECU 3 (step S5). If there is data received from the steering ECU 3 ("YES" in step S5), the communication application 63 initializes the communication interruption determining counter for the steering ECU 3 (step S6). If there is no data received from the steering ECU 3 ("NO" in step S5), the communication application 63 compares the count value of the communication interruption determining counter for the steering ECU 3 with the reference value for determining a communication interruption (step S7). If the count value is equal to or larger than the reference value ("YES" in step S7), the communication application 63 determines that the communication with the steering ECU 3 is in an interrupted state (step S8).

The communication application 63 then determines whether there is data received from the yaw rate G sensor 7 (step S9). If there is data received from the yaw rate G sensor 7 ("YES" in step S9), the communication application 63 initializes the communication interruption determining counter for the yaw rate G sensor 7 (step S10). If there is no data received from the yaw rate G sensor 7 ("NO" in step S9), the communication application 63 compares the count value of the communication interruption determining counter for the yaw rate G sensor 7 with the reference value for determining a communication interruption (step S11). If the count value is equal to or larger than the reference value ("YES" in step S11), the communication application 63 determines that the communication with the yaw rate G sensor 7 is in an interrupted state (step S12).

The communication application 63 then determines whether there is data received from the VSC ECU 6 (step S13). If there is data received from the VSC ECU 6 ("YES" in step S13), the communication application 63 initializes the communication interruption determining counter for the VSC ECU 6 (step S14). If there is no data received from the VSC ECU 6 ("NO" in step S13), the communication application 63 compares the count value of the communication interruption determining counter for the VSC ECU 6 with the reference value for determining a communication interruption (step S15). If the count value is equal to or larger than the reference value ("YES" in step S15), the communication application 63 determines that the communication with the VSC ECU 6 is in an interrupted state (step S16).

The data to be used for determining whether there is a communication interruption may be a frame that is transmitted at the shortest interval among the frames transmitted from the subject node. In this manner, the time required for determining whether there is a communication interruption can be shortened.

The nodes that are connected to the IG line 33 and require a long time to determine whether there is a communication interruption may be excluded from the nodes for determining a communication interruption. Also, the nodes that have long intervals for communications with the eco-run ECU 1 also require a long time for determining a communication interruption, and may be excluded from the communication interruption determining operation.

Figure 5:
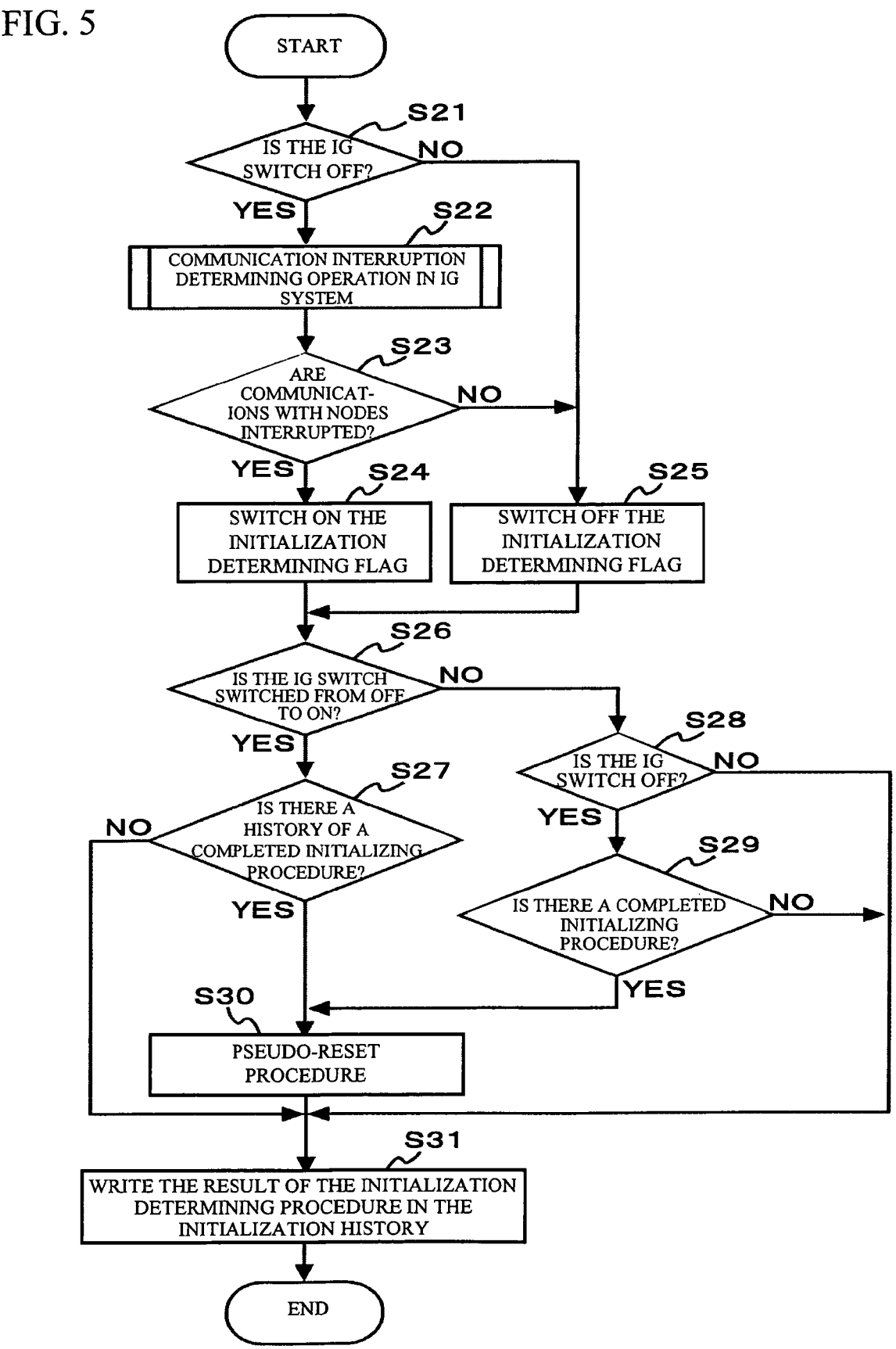
FIG. 5 is a flowchart showing the procedures to be carried out between the time when the IG switch is switched off and the time when the RAM of the eco-run ECU is reset.

Referring now to the flowchart shown in FIG. 5, the procedures to be carried out since the IG switch 27 is switched off until the RAM 53 of the eco-run ECU 1 is reset is described.

When a signal from the IG switch monitor terminal is a signal indicating an IG switch OFF state ("YES" in step S21), the eco-run ECU 1 determines whether the communications with the nodes connected to the IG line 33 are interrupted (step S22). This communication interruption determining procedures have already been described with reference to the flowchart shown in FIG. 3, and therefore, explanation of them is omitted here.

The eco-run ECU 1 then determines whether the communications with two or more nodes are in an interrupted state. For example, if the communications with two or more nodes are in an interrupted state ("YES" in step S23), the eco-run ECU 1 puts an initialization determination flag into an ON state (step S24). If the communication with less than two node is in an interrupted state ("NO" in step S23), the eco-run ECU 1 puts the initialization determination flag into an OFF state (step S25).

The eco-run ECU 1 then determines whether the IG switch 27 is switched from an OFF state to an ON state (step S26). More specifically, the eco-run ECU 1 determines whether the signal of the monitor terminal that monitors the state of the IG switch 27 is switched from an IG switch off state to an IG switch ON state before the power supply to the eco-run ECU 1 is stopped (step S26). If there is not a change in the state of the signal of the monitor terminal ("NO" in step S26), the eco-run ECU 1 determines whether the signal of the monitor terminal remains in an IG switch OFF state (step S28). If the signal of the monitor terminal remains in an IG switch OFF state ("YES" in step S28), the eco-run ECU 1 determines whether there is an initializing operation (step S29). The initialization history indicates the previous value of the initialization determination flag. When the initialization determination flag is ON, the initialization history shows that there is a record. When the initialization determination flag is OFF, the initialization history shows that there is not a record.

At this point, the result of the initialization determination performed in step S23 has not been recorded as the initialization history ("NO" in step S29), the operation moves on to step S31. In step S31, referring to the initialization determination flag, the eco-run ECU 1 writes the result of the initialization determination on the initialization history.

After that, the operation returns to step S21, and the eco-run ECU 1 carries out the procedures of steps S21 through S25. The eco-run ECU 1 then determines whether the signal that is input to the monitor terminal is switched from an IG switch OFF state to an IG switch ON state (step S26). If the signal of the monitor terminal is switched from an IG switch OFF state to an IG switch ON sate ("YES" in step S26), the eco-run ECU 1 determines whether there is a recorded history of an initializing operation (step S27). It there is a recorded history of an initializing operation ("YES" in step S27), the eco-run ECU 1 carries out a pseudo-reset procedure (step S30). In the pseudo-reset procedure, the variables with respect to eco-run control recorded in the RAM in the eco-run ECU 1 are reset.

Even if the IG switch 27 remains in an OFF state ("NO" in step S26 and "YES" in step S28), the pseudo-reset procedure is carried out (step S30) when there is a recorded history of an initializing operation ("YES" in step S29).

If the state of the monitor signal is switched from an IG switch OFF state to an IG switch ON state by temporary disconnection of the signal line 30 for monitoring the IG line 33, the monitor signal is switched from an ON state to an OFF state to an ON state during a short period of time. Accordingly, no interruptions are detected from the communications with the other nodes connected to the IG line 33 during the short period of time. When the signal line 30 for monitoring the IG line 33 is temporarily disconnected, a history of an initializing operation is not recorded, and the pseudo-reset procedure is not carried out.

As described above, in this embodiment, the eco-run ECU 1 can accurately determine whether the IG switch 27 is switched on and off by a driver's operation or temporary disconnection of the signal line 30. Accordingly, the variables recorded in the RAM in the eco-run ECU 1 can be reset, only when the IG switch 27 is switched from an OFF state to an ON state by a driver's operation.

In a case where the power supply is temporarily cut off, eco-run control against the user's will may be prohibited not only by resetting the variables (flags and variables stored in a temporary memory) with respect to eco-run control in the eco-run ECU 1, but also by software. For example, instead of the pseudo-reset procedure of step S30 in FIG. 5, the eco-run prohibiting signal may be masked and rejected until predetermined requirements are satisfied. The predetermined requirements include "a predetermined period of time has passed" and "an interrupted communication with an ECU is recovered".

Also, to prohibit eco-run control against the user's will, no engine start control is performed by operating the starter motor, or the engine is stopped by cutting off the fuel injection to the engine.

Although a preferred embodiment of the present invention has been shown and described, it would be appreciated by those skilled in the art that changes may be made in the embodiment without departing from the principles and spirit of the invention, the scope of which is defined in the claims and their equivalents.

The present application is based on Japanese Patent Application No. 2007-112414 filed on Apr. 20, 2007, the entire disclosure of which is hereby incorporated by reference.

What is claimed is:

1. An eco-run control device that is mounted on a vehicle and is capable of performing eco-run control to stop an engine if predetermined stop requirements are satisfied, and to restart the engine if predetermined start requirements are later satisfied, the eco-run control device comprising:

at least one first type control unit having power supplied thereto in accordance with a state of an ignition;

at least one second type control unit having power supplied thereto in accordance with a state of an ACC;

a start control unit that, when the power supplied to the at least one first type control unit or the power supplied to the at least one second type control unit is turned from off to on, performs a start control operation on the engine if the start control unit receives an eco-run prohibiting request from the at least one first type control unit or from the at least one second type control unit;

a main relay unit that continues the power supply to the eco-run control device for a predetermined period of time even after the ignition is turned off;

a determining unit that receives an ignition state signal from a predetermined signal line and determines a state of the ignition as being off when the received ignition state signal indicates that the ignition is off, based on whether signals from at least two of the control devices of the first type are interrupted; and a prohibiting unit that prohibits the reception of the eco-run prohibiting request even when the at least one first type control unit or the at least one second type control unit sends the eco-run prohibiting request after the ignition detection unit determines that the ignition is off, and prevents the engine from being started by the start control unit.

2. The eco-run control device according to claim 1, wherein at least one of the at least one first type control unit is an engine control unit and at least one of the at least one first type control unit is a vehicle stability control unit.

3. The eco-run control device according to claim 1, wherein the determining unit determines a state of the ignition only based on communication from the at least one first type control unit.

4. The eco-run control device according to claim 1, wherein the prohibiting unit includes an initialization controlling unit that initializes a variable stored in a memory indicating that the engine is prohibited from starting if the determining unit detects that the ignition is off.

5. The eco-run control device according to claim 1, wherein the prohibiting unit prevents the engine from starting if there is a decision history that shows that the signals from the at least two first type control units are interrupted and the ignition is off.

6. The eco-run control device according to claim 1, wherein the eco-run control device receives a stop signal for determining an engine stop, and determines whether the ignition is switched by a driver operation.

7. The eco-run control device according to claim 6, wherein the engine control signal indicates a location of a shift lever, a speed of the vehicle, a speed of the engine, a condition of whether a foot brake is on, and a condition of whether a door is opened or closed.

8. The eco-run control device according to claim 1, further comprising a third type control unit that is connected directly to a +B line, wherein the start control unit performs the start control of the engine if the start control unit receives the eco-run prohibiting request from any of the at least one first type control unit, the at least one second type control unit, or the third type control unit.

9. A method for controlling an eco-run control device that is mounted on a vehicle and is capable of performing eco-run control to stop an engine if predetermined stop requirements are satisfied, and to restart the engine if predetermined start requirements are later satisfied, the method comprising:

performing a start control operation on the engine, when the power supplied to at least one first type control unit or the power supplied to at least one second type control unit is turned from off to on, if a start control unit receives an eco-run prohibiting request from the at least one first type control unit or from the at least one second type control unit;

continuing the power supply to the eco-run control device for a predetermined period of time even after the ignition is turned off;

receiving an ignition state signal from a predetermined signal line and determining the state of the ignition as being off when the received ignition state signal indicates that the ignition is off, based on whether signals from at least two of the control devices of the first type are interrupted; and prohibiting the reception of the eco-run prohibiting request even when the at least one first type control unit or the at least one second type control unit sends the eco-run prohibiting request after the ignition detection unit determines that the ignition is off, and prevents starting the engine from being started by the start control unit.

* * * * *